United States Patent [19]

Weyrauch

[11] Patent Number: 4,959,908
[45] Date of Patent: Oct. 2, 1990

[54] ATTACHMENT ARRANGEMENT FOR A SIGHTING TELESCOPE

[75] Inventor: Adolf Weyrauch, Aalen, Fed. Rep. of Germany

[73] Assignee: Carl-Zeiss-Stiftung, Heidenheim, Fed. Rep. of Germany

[21] Appl. No.: 366,148

[22] Filed: Jun. 14, 1989

[30] Foreign Application Priority Data

Jun. 16, 1988 [DE] Fed. Rep. of Germany ....... 3820471

[51] Int. Cl.$^5$ .............................................. F41G 1/38
[52] U.S. Cl. ...................................... 33/245; 33/247; 42/100; 42/101
[58] Field of Search ................. 33/245, 246, 247, 248, 33/233, 249, 250; 42/101, 100

[56] References Cited

U.S. PATENT DOCUMENTS

| | | |
|---|---|---|
| 225,458 | 12/1872 | Heym . |
| 960,813 | 6/1910 | Burton ................................ 33/245 |
| 2,942,346 | 6/1960 | Staubach .............................. 33/250 |
| 3,045,351 | 7/1962 | Dayton ................................. 33/248 |
| 3,992,782 | 11/1976 | Rickert . |
| 3,992,783 | 11/1976 | Dunlap et al. . |
| 4,021,954 | 5/1977 | Crawford . |

FOREIGN PATENT DOCUMENTS

286145 3/1970 Austria .
2050585 10/1971 Fed. Rep. of Germany .

Primary Examiner—William A. Cuchlinski, Jr.
Assistant Examiner—William C. Dowling
Attorney, Agent, or Firm—Walter Ottesen

[57] ABSTRACT

The attachment arrangement of the invention includes a V-shaped rail of a sighting telescope housing which is placed in a V-shaped rail guide from above. The rail is pulled into the rail guide. The tension force is preferably provided by a threaded fastener in order to provide a releasable connection. Care must be taken to ensure that a clear space remains beneath the rail so that the rail can align itself undisturbed in the rail guide.

10 Claims, 3 Drawing Sheets

ATTACHMENT ARRANGEMENT FOR A SIGHTING TELESCOPE

FIELD OF THE INVENTION

The invention relates to an attachment arrangement for a sighting telescope for which a rail connected to the housing of the sighting telescope is pushed into a correspondingly formed rail of an adapter. The connection is fixed by means of at least one fixing device.

BACKGROUND OF THE INVENTION

German Pat. No. 2,050,585 discloses an attachment for a sighting telescope wherein clamping rings on a removable support hold a sighting telescope. This attachment can quickly lead to damage of the telescope housing because the holding forces act also upon the thin walls of the housing. Furthermore, an exact alignment of the telescope to the weapon is very time consuming with this kind of attachment arrangement.

U.S. Design Pat. No. 225,458 shows an attachment wherein a telescope having a dovetail slot is pushed onto a dovetail rail and a lateral clamping of the two parts is achieved with the aid of screws. This lateral clamping by means of screws causes a lateral offset movement of the sighting telescope whose value must be determined with each assembly. Furthermore, this attachment has the disadvantage that the telescope is fixed along a line contact on one side of the slot while only a point contact fixation is provided on the other side. This leads to a loosening of the screws over a longer period of use and can thereby make the attachment unreliable.

Austrian Pat. No. 286,145 discloses an attachment wherein a dovetail milled directly into the telescope housing is clamped laterally by means of a dovetail slot. The assembly of this attachment is inconvenient and complicated and leads to a lateral displacement during fixation.

U.S. Pat. Nos. 3,992,782 and 3,992,783 disclose an attachment wherein a telescope is held with a laterally clamping dovetail slot on a dovetail guide. A lateral displacement occurs here also and this requires assembly by skilled personnel.

U.S. Pat. No. 4,021,954 discloses an attachment wherein a telescope having a dovetail is attached to a mounting bracket connected to a weapon via a laterally clamping adapter. In this arrangement, the connection via the adapter occurs by means of two dovetail slots. However, the problem of lateral displacement is here also not eliminated.

SUMMARY OF THE INVENTION

It is an object of the invention to provide an attachment arrangement for a sighting telescope wherein a lateral displacement during assembly is avoided while at the same time achieving a very reliable connection notwithstanding a simple assembly.

The attachment arrangement of the invention is for a sighting telescope having a housing. The attachment arrangement includes: a housing rail extending from the housing; an adaptor defining an adaptor rail formed therein for accommodating the housing rail; the housing rail and the adaptor rail having forms corresponding to respective trapezoids when viewed in cross section and the housing rail being placed in the adaptor rail so as to cause the legs of the trapezoid of the housing rail to be in contact engagement with corresponding ones of the legs of the trapezoid of the adaptor rail; fixing means for pulling said housing rail into the adaptor rail; and, the trapezoids having respective short bases which are mutually adjacent and the short bases having respective lengths selected so as to cause the short bases to define and maintain a clear space therebetween in the presence of the pulling force.

The inventive concept of this attachment arrangement is that a V-shaped rail of the housing of a sighting telescope is placed in a V-shaped rail guide with the rail of the housing being pulled into the rail guide. An alignment of the rail to the rail guide occurs automatically because of the V-shape. The rail of the housing can be placed from above into the rail guide. For this purpose however, a clear space must remain between the short faces of the trapezoid so that the rail can freely align itself in the guide rail. This constitutes a significant simplification of the assembly.

Because of the large contact-engaging surfaces between rail and rail guide, a connection is obtained which can resist very large forces. The preferred angle range $\phi$ for the V-shaped rail and the V-shaped rail guide lies between 10° and 40°.

The fixing device advantageously includes a screw which engages directly into the rail of the housing of the sighting telescope or engages the rail of the telescope housing by means of a clamping part located in the rail. The axis of the screw should be as close as possible to the connecting line between the sighting telescope and the weapon so that the transverse forces acting on the screw are as low as possible.

The rail of the telescope housing is held in the guide rail via a clamping part. The connection by means of this clamping part has several advantages. The housing of the telescope is often made of a soft material for the purpose of reducing weight so that the attachment of a screw in the material of the rail is unreliable. The fixation device must however reliably connect the rail with the rail guide even after being subjected to several loadings. The clamping part assists in this respect and fits into a slot having a shape corresponding thereto. The clamping part does not constitute a weight problem because of its small size and the material of the rail which provides no function can likewise be eliminated to reduce weight. If this removal of material is specific, then a slot forms in the rail and serves as a guide for the clamping part made of solid material. The fixation device connects the clamping part with an adapter which, in turn, is secured to the weapon with the aid of threaded fasteners. The force is transmitted on the wide contact-engaging surfaces of the clamping part with the rail and is no longer transmitted via the sensitive thread.

A further advantage is that no further machining on the housing of the sighting telescope is required when the latter is assembled on another weapon. The clamping part is constrained to remain disposed in the rail to facilitate tightening with the aid of the screw. For this purpose, position fixing means in the form of a depression or of a rise are machined into the slot.

An opening is provided in the slot of the rail which facilitates placing and removing the clamping part. In this way, the clamping part must not necessarily be pushed through a long slot to its position and no limitation is imposed on the form of the sighting telescope by the nature of the attachment.

The form of the clamping part can advantageously be a V-shape or a T-shape with the slot in the rail having the corresponding shape. It is conceivable that the clamping part can have other shapes with the preferred shapes affording the advantage of an automatic alignment in the slot.

The corners of the clamping part are preferably rounded so that a canting or tilting of the clamping part in the slot is prevented.

In order that the sighting telescope can be mounted and removed when the adapter is already tightly connected to the weapon, a laterally working force must be redirected such that the rail is pulled into the rail guide. For this purpose, the rail or a clamping part located in the rail slot is provided with an extension which projects into a corresponding opening of the adapter. In this extension, a truncated conically-shaped opening is provided transverse to the optical axis which is continued as a circular threaded opening in the adapter. A screw is screwed into this threaded opening perpendicularly to the axis of the extension. The end of the screw is configured so as to have a truncated conical shape. The screw projects with its end into the opening of the extension. If the screw is rotated deeper, then it lies against one side of the opening with its end and presses the rail into the rail guide.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
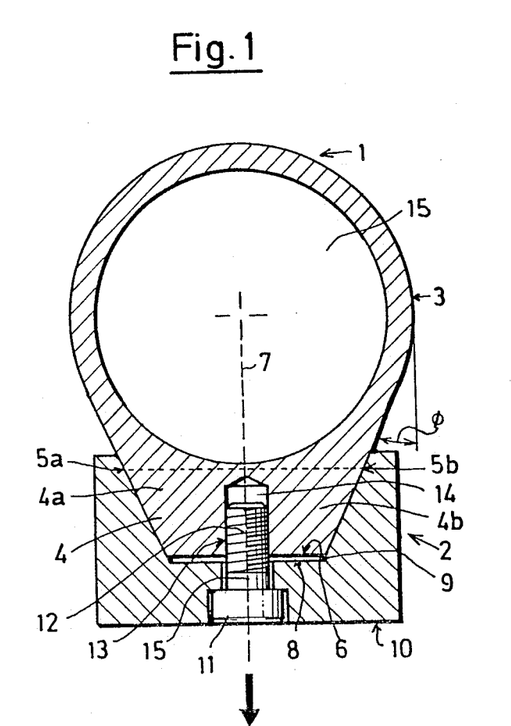
FIG. 1 is a section view transverse to the optical axis and taken through a sighting telescope housing having an adapter threadably fastened thereto.

FIG. 1 is a section view taken through the housing 3 of a sighting telescope. The sighting telescope 1 is attached to an adapter 2. After the sighting telescope 1 is mounted, this adapter 2 is releasably attached to the weapon by means of screws in order to make possible a later disassembly of the sighting telescope 1.

The sighting telescope housing 3 is configured as a trapezoidally-shaped rail 4 on the side thereof facing the weapon. The sighting telescope 1 is attached to the adapter 2 with the aid of this rail 4. Rail 4 has a V-shaped form in this section perpendicular to the optical axis. The rail 4 tapers in a direction toward the weapon at an angle $\phi$ which is 26° in the embodiment shown. This rail 4 lies in a V-shaped rail guide 5 of the adapter 2. The rail guide 5 has an opening angle which corresponds to the tapering angle of the rail 4. In this way, an alignment of the sighting telescope housing 3 to the adapter 2 is automatically provided when the rail 4 is introduced into the rail guide 5 with the alignment always being obtained even after numerous assemblies. The sides (4a, 4b) of the rail 4 lie against the entire surfaces on the sides (5a, 5b) of the rail guide 5. This assures an optimal hold of the rail 4 in the adapter 2.

The rail 4 of the sighting telescope housing 3 is cut so that it has a flat surface 6 facing the adapter 2. This surface 6 is perpendicular to the connecting line 7 between the telescope and the weapon and is located opposite the surface 8 of the adapter 2 which is parallel thereto. These parallel surfaces (6, 8) do not contact each other even after the assembly. The clear space 9 between the surfaces (6, 8) prevents a wedging during assembly and thereby provides reliability of assembly when the sighting telescope housing 3 is attached to the adapter 2.

A screw 11 is inserted into the adapter 2 perpendicular to these surfaces (6, 8) at the side 10 facing toward the weapon. The thread 12 of the screw 11 threadably engages a thread 13 of an opening 14 in the rail 4 of the sighting telescope housing 3. The screw axis 15 lies as close as possible to the connecting line 7 between the sighting telescope and the weapon so that virtually no transverse forces act on the screw 11 when the weapon is fired. The adapter 2 is made of steel and the housing 3 is made of a light metal such as aluminum. In order to ensure a reliable connection between the adapter 2 and the housing 3, the screw 11 must be so configured with respect to its diameter and especially with respect to its thread 12 that it can withstand the forces developed when the weapon is fired without loosening. Since this is dependent upon the recoil force of the weapon used, an attachment with several screws 11 can be used as may be required.

The adapter 2 is aligned with respect to the weapon and threadably fastened thereto after the sighting telescope 1 is mounted on the adapter 2.

Figure 2A:
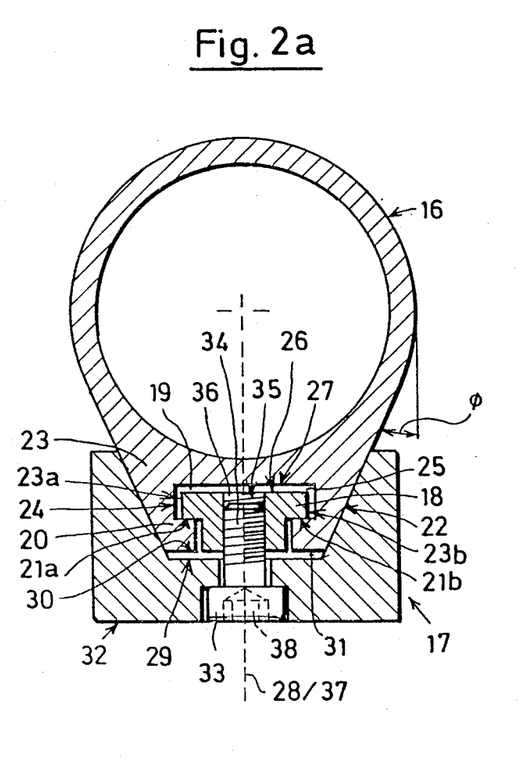
FIG. 2a is a section view through a sighting telescope wherein the fixation device includes a T-shaped clamping part.
Figure 2B:
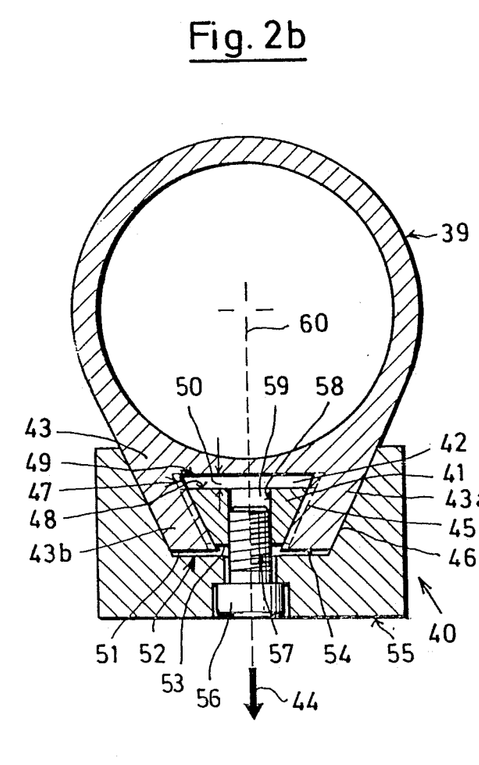
FIG. 2b is a section view through a sighting telescope wherein the fixation device includes a V-shaped clamping part.

During the assembly of the sighting telescope housing 3 on the adapter 2 in the embodiment of FIG. 1, care must be taken so that one does not penetrate into the interior 15 of the housing 3 when drilling the opening 14 which would otherwise make necessary a costly repair. This problem is avoided in the embodiments of FIGS. 2a and 2b during assembly of the housings (16, 39). Furthermore, the embodiments of FIGS. 2a and 2b are significant also in that the assembly of the sighting telescope housing (16, 39) can take place onto different adapters (17, 40) taken off the weapons without it being necessary that these adapters be changed for the assembly of another sighting telescope and without the sighting telescope itself having to be changed.

This convenience during assembly is obtained by means of a modification of the fixation of the sighting telescope housing 16 on the adapter 17 as shown in FIG.

2a. The screw attachment of the housing 16 to the adapter 17 is not performed directly; instead, this fixation is achieved via a clamping part 18. This clamping part 18 is disposed in a slot 19 in the rail 20 tapering downwardly rather than in the opening 14 having the winding 13 as shown in FIG. 1. The slot 19 is configured so as to have a T-shape and defines holding surfaces for the T-shaped clamping part 18. This clamping part 18 is so configured that it pulls the rail 23 of the housing 16 into the V-shaped rail guide 22 of the adapter 17 at its contact-engaging surface (21a, 21b). A clear space 24 to the housing 16 is provided at the end surfaces (23a, 23b) of the clamping part 18 so that the clamping part 18 can be easily moved in the slot 19 when this part is not threadably fastened. This freedom of movement is necessary so that the clamping part 18 can later be removed from the slot 19. For the same reason, a clear space 25 is provided between the upper surface 26 of the clamping part 18 and the lower surface 27 of the slot 19. These free spaces (24, 25) have no influence on the alignment of the sighting telescope housing 16 on the adapter 17 since this alignment is transmitted by the contact surfaces of the rail guide 22 (angle of inclination $\phi$) and the contact surfaces of the housing 16. To ensure that this alignment can be made without a disturbance when the threaded fasteners are tightened, a clear space 31 is provided between the upper surface 29 of the adapter 17 on the one hand and the respective lower surfaces 30 of the V-shaped rail 20 of the housing 16 and of the clamping part 18 on the other hand. The surface 29 of the adapter 17 is perpendicular to the connecting line 28 of the sighting telescope and the weapon.

A screw 33 is inserted into the adapter 17 perpendicularly to these surfaces (29, 30) at the side 32 facing the weapon. The thread 34 of the screw 33 engages a thread 35 of an opening 36 in the clamping part 18. The screw axis 37 here also lies in the manner described with respect to FIG. 1 and is as close as possible to the connecting line 28 between the sighting telescope and the weapon. The screw 33 and the clamping part 18 are made of a hard material such as steel; whereas, the sighting telescope housing 16 is made of aluminum so that weight can be reduced. The screw 33 is configured as a machine screw. In its head, the screw 33 has a hexagonal slot 38 so that it can be easily tightened with a hexagonal drive key.

FIG. 2b shows a further embodiment of the invention for attaching the housing 39 to an adapter 40 with a clamping part 41. In this embodiment, the slot 42 in the rail 43 of the sighting telescope housing 39 has a V-shape with the slot 42 tapering downwardly. The clamping part 41 is also configured so as to be V-shaped in correspondence to the slot 42. The embodiment of FIG. 2b affords the advantage that the force 44 applied by the clamping part 41 to the housing 39 is transmitted via a large surface 45. The inclination of this surface 45 corresponds to the inclination of the contact surface 46 between the housing 39 and the adapter 40. This affords the advantage that the material thickness of the rail side portions (43a, 43b) is uniform and a uniform force distribution is present in the region of the contact surface 46. The slot 42 has position fixation means in the form of a shallow depression 47 into which the clamping part 41 can slip so that the latter has a certain position orientation in the slot 42 of the rail 43 of the housing 39 in advance of tightening the screw. The sides of the depression 47 along the slot 42 of the rail 43 are configured as ramps. This facilitates assembly.

An adequately large clear space 50 is provided between the upper surface 48 of the clamping part 41 and the base surface 49 of the slot 42 so that the clamping part 41 can be easily moved in the slot 42 for the condition in which the screws are not engaged. To assure a precise alignment, a further clear space 54 is provided between the upper surface 52 of the adapter 40 on the one hand, and the lower surface 51 of the rail and the lower side 53 of the clamping part, on the other hand.

A screw 56 engages the adapter 40 at the side thereof facing the weapon and extends perpendicularly to these surfaces (51, 52, 53). The thread 57 of the screw 56 threadably engages an internal thread 58 of the opening 59 of the clamping part 41. The screw axis 60 is orientated in the manner described with respect to FIG. 2a. All the information of the description pertaining to FIG. 2a is applicable here up to the form of the clamping part 41 and the differences described.

Figure 3A:
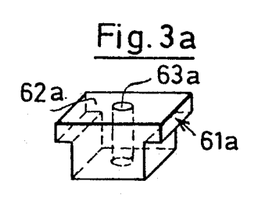
FIG. 3a is a perspective view of a T-shaped clamping part having a square-shaped base surface.
Figure 3B:
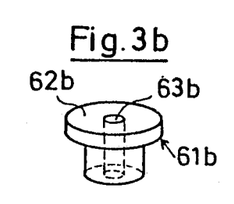
FIG. 3b is a perspective view of a T-shaped clamping part having a circular base surface.

Clamping parts 61a to 61g are shown in FIGS. 3a to 3g, respectively, and correspond to those shown in FIGS. 2a and 2b. The clamping part 61a of a T-shaped slot can have a square surface 62a as shown in FIG. 3a. In FIG. 3b, the clamping part 61b is shown as having a round surface 62b while in FIG. 3e, the clamping part 61e is shown as having a rectangular surface 62e. The embodiments shown in FIGS. 3a to 3d all have one threaded opening 63a, 63b, 66c and 66d, respectively, while the embodiments shown in FIGS. 3e to 3g all have at least two threaded openings.

Figure 3C:
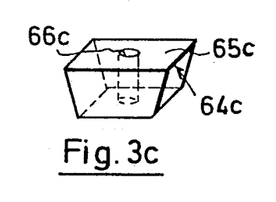
FIG. 3c is a perspective view of a V-shaped clamping part having a square-shaped base surface.
Figure 3D:
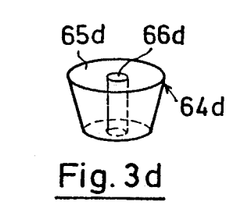
FIG. 3d is a perspective view of a V-shaped clamping part having a circular base surface.

The clamping part 64c shown in FIG. 3c is for a V-shaped slot and has a square surface 65c. The embodiment shown in FIG. 3d has a round surface 65d and the embodiment shown in FIG. 3f has a rectangular surface 65f. The embodiment shown in FIG. 3c has one opening 66c whereas the embodiment shown in FIG. 3f has at least two openings 66f.

Figures 3E, 3F, 3G:
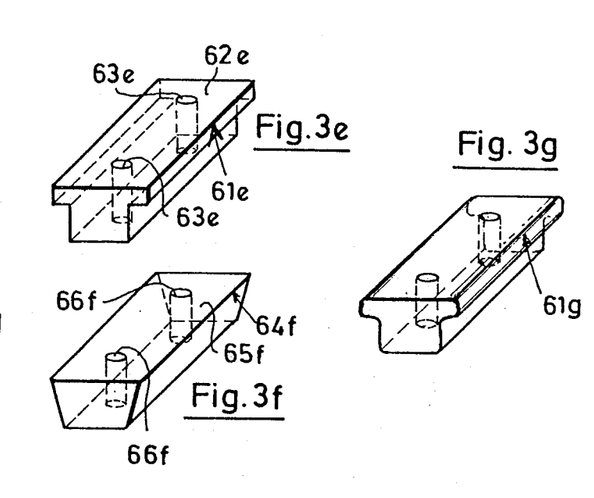
FIG. 3e is a perspective view of a T-shaped clamping part having a rectangular base surface.
FIG. 3f is a perspective view of a V-shaped clamping part having a rectangular base surface.
FIG. 3g is a perspective view of a T-shaped clamping part having a rectangular base surface and rounded edges.

A clamping part 61g is shown in FIG. 3g wherein the edges are rounded. The rounded edges prevent a tilting of the clamping part 61g in the rail slot.

Figure 4:
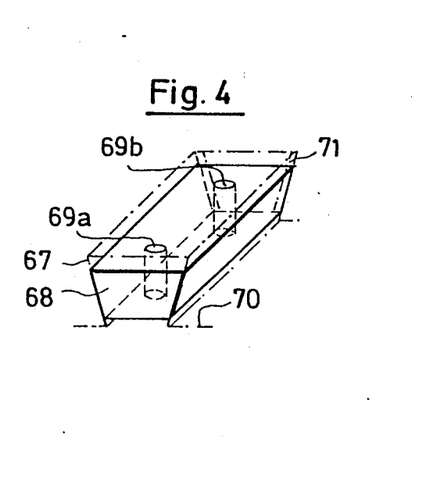
FIG. 4 is a perspective view of a V-shaped clamping part having a rectangular base surface in a V-shaped slot provided with position fixation means.

FIG. 4 shows a section taken through a V-slot 67 shown in phantom outline with the clamping part 68 having two threaded openings (69a, 69b). During assembly, the clamping part 68 is pushed into the slot 67 of the rail 70 of the sighting telescope housing up to a stop 71 and is later tightened with screws.

Figure 5:
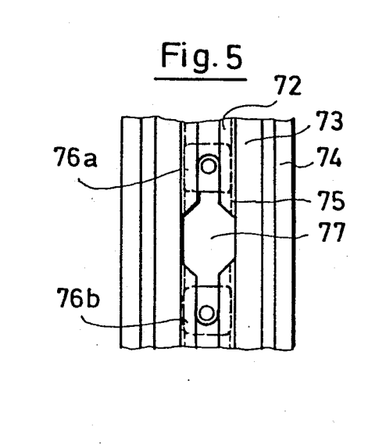
FIG. 5 is a plan view of the lower side of a slot having an opening for introducing or removing clamping parts; and, FIG. 6 is a lateral attachment for attaching the sighting telescope onto an adapter.

FIG. 5 shows a modified slot 72 in the rail 73 of the sighting telescope housing 74 wherein an opening 77 is provided next to a recess 75 having a ramp for receiving a square clamping part 76. The clamping parts (76a, 76b) are introduced into the slot 72 through the opening 77.

Figure 6:
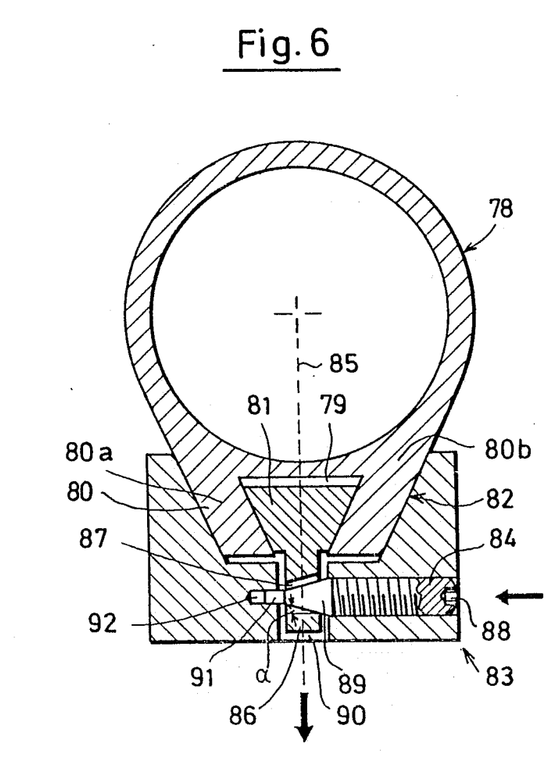

FIG. 6 is a section view taken through a sighting telescope housing 78 wherein the housing 78 has a V-shaped rail defining a slot 79. A V-shaped clamping part 81 pulls the rail 80 into the V-shaped rail guide 82 of the adapter 83. In contrast to the embodiments disclosed above, the fixation here occurs by means of the screw 84 and not along a screw axis which is as close as possible to the connecting line 85 between the sighting telescope and the weapon. The clamping part 81 has an extension 86 about this line 85 with the extension having a lateral opening 87. This opening 87 is configured in the form of a truncated cone having an angle $\alpha$. A headless screw 84 having a hexagonal drive slot 88 is screwed into the adapter 83 perpendicularly to this extension 86 of the clamping part 81. This screw 84 has an end portion 89 with a conical segment having an angle α which matches the angle of the truncated conical opening 87. The end of the end portion 89 is configured as a pin 91 which engages into a slot 92 in the adapter 83 and thereby provides a support for the screw 84 in the adapter 83 behind the opening 87. The screw 84 lies only against the lower side of the truncated conical opening 87 since the diameter of the screw 84 is less than the diameter of the conical opening 87 when the screw is threadably engaged as shown in FIG. 6. With the rotation of the screw 84 inwardly, the end portion 89 of the screw slides into the conical opening 87 and forces the rail 80 of the housing 78 into the rail guide 82 of the adapter 83. Through this routing of force, the sighting telescope housing 78 can be mounted with the adapter 83 threadably fastened to the weapon. Stated otherwise, the adapter 83 can in this way constitute part of the housing of the weapon.

It is understood that the foregoing description is that of the preferred embodiments of the invention and that various changes and modifications may be made thereto without departing from the spirit and scope of the invention as defined in the appended claims.

What is claimed is:

1. An attachment arrangement for a sighting telescope having a housing, the attachment arrangement comprising:

a housing a rail extending from said housing;

an adaptor defining an adaptor rail formed therein for accommodating said housing rail;

said housing rail and said adaptor rail having forms corresponding to respective trapezoids when viewed in cross section;

said trapezoids having respective short bases and each trapezoid defining an axis of symmetry perpendicular to the short base corresponding thereto;

said housing rail being placed in said adaptor rail so as to cause the axes of said trapezoids to be coincident and so as to cause the legs of the trapezoid of said housing rail to be in contact engagement with corresponding ones of the legs of the trapezoid of said adaptor rail;

fixing means for developing a pulling force acting along or in close proximity to said axes to pull said housing rail into said adaptor rail; and, said trapezoids having respective short bases which are mutually adjacent and said short bases having respective lengths selected so as to cause said short bases to define and maintain a clear space therebetween in the presence of said pulling force.

2. An attachment arrangement for a sighting telescope having a housing, the attachment arrangement comprising:

a housing rail extending from said housing;

an adaptor defining an adaptor rail formed therein for accommodating said housing rail;

said housing rail and said adaptor rail having forms corresponding to respective trapezoids when viewed in cross section and said housing rail being placed in said adaptor rail so as to cause the legs of the trapezoid of said housing rail to be in contact engagement with corresponding ones of the legs of the trapezoid of said adaptor rail;

fixing means for pulling said housing rail into said adaptor rail;

said trapezoids having respective short bases which are mutually adjacent and said short bases having respective lengths selected so as to cause said short bases to define and maintain a clear space therebetween in the presence of said pulling force; and, said fixing means being a screw defining a longitudinal screw axis and said screw being mounted in said adaptor and threadably engaging said housing rail so as to pull said housing rail into said adaptor rail.

3. An attachment arrangement for a sighting telescope having a housing, the attachment arrangement comprising:

a housing rail extending from said housing;

an adaptor defining an adaptor rail formed therein for accommodating said housing rail;

said housing rail and said adaptor rail having forms corresponding to respective trapezoids when viewed in cross section and said housing rial being placed in said adaptor rail so as to cause the legs of the trapezoid of said housing rail to be in contact engagement with corresponding ones of the legs of the trapezoid of said adaptor rail;

fixing means for pulling said housing rail into said adaptor rail;

said trapezoids having respective short bases which are mutually adjacent and said short bases having respective lengths selected so as to cause said short bases to define and maintain a clear space therebetween in the presence of said pulling force; and, said fixing means including slot means formed in the surface defining the short base of said housing rail; a clamping part engaged in said slot means and having a cross section adapted to said slot means; and, holding means for connecting said clamping part to said adaptor so as to pull said housing rail into said adaptor rail.

4. The attachment arrangement of claim 3, position fixation means machined into said slot means for positioning said clamping part therein.

5. The attachment arrangement of claim 4, said slot means having an opening formed therein for facilitating the insertion and removal of said clamping part into and out of said slot means.

6. The attachment arrangement of claim 3, said slot means and said clamping part each having a V-shaped cross section.

7. The attachment arrangement of claim 3, said slot means and said clamping part each having a T-shaped cross section.

8. The attachment arrangement of claim 3, said clamping part having rounded edges.

9. An attachment arrangement for a sighting telescope having a housing, the attachment arrangement comprising:

a housing rail extending from said housing;

an adaptor defining an adaptor rail formed therein for accommodating said housing rail;

said housing rail and said adaptor rail having forms corresponding to respective trapezoids when viewed in cross section and said housing rail being placed in said adaptor rail so as to cause the legs of the trapezoid of said housing rail to be in contact engagement with corresponding ones of the legs of the trapezoid of said adaptor rail;

fixing means for pulling said housing rail into said adaptor rail;

said trapezoids having respective short bases which are mutually adjacent and said short bases having respective lengths selected so as to cause said short bases to define and maintain a clear space therebetween in the presence of said pulling force; and, said housing rail having an extension extending downwardly beyond the short base thereof into said adaptor;

said adaptor having an opening formed in the surface defining the short base thereof for accommodating said extension therein;

said extension having a truncated conical opening formed therein;

a screw threadably engaging said adaptor so as to extend transversely to said extension;

said screw having an end portion having a truncated conical configuration; and, said end portion extending into said truncated conical opening so as to be in contact engagement with one side thereof so as to pull said extension downwardly so as to, in turn, pull said housing rail into said adaptor rail.

10. In a weapon equipped with a sighting telescope having a housing, the sighting telescope defining an optical axis and the weapon having a barrel defining a central axis parallel to said optical axis, and an attachment arrangement for attaching the sighting telescope to the weapon, the attachment arrangement comprising:

a housing rail extending from said housing;

an adaptor disposed between said housing and the weapon;

said adapter defining an adaptor rail formed therein for accommodating said housing rial;

said housing rail and said adaptor rail having forms corresponding to respective trapezoids when viewed in cross section and said housing rail being placed in said adaptor rail so as to cause the legs of the trapezoid of said housing rail to be in contact engagement with corresponding ones of the legs of the trapezoid of said adaptor rail;

fixing means for pulling said housing rail into said adaptor rail;

said trapezoids having respective short bases which are mutually adjacent and said short bases having respective lengths selected so as to cause said short bases to define and maintain a clear space therebetween in the presence of said pulling force; and, said fixing means being a screw defining a longitudinal screw axis perpendicular to said optical axis and said screw being mounted in said adaptor and threadably engaging said housing rail so as to pull said housing rail into said adaptor rail.

* * * * *

UNITED STATES PATENT AND TRADEMARK OFFICE
CERTIFICATE OF CORRECTION

PATENT NO. : 4,959,908

DATED : October 2, 1990

INVENTOR(S) : Adolf Weyrauch

It is certified that error appears in the above-identified patent and that said Letters Patent is hereby corrected as shown below:

On the title page, in column 1, under U.S. Patent Documents, line 1: delete "12/1872" and substitute -- 12/1972 -- therefor.

In column 8, line 15: delete "rial" and substitute -- rail -- therefor.

In column 10, line 4: delete "rial" and substitute -- rail -- therefor.

Signed and Sealed this

Seventh Day of April, 1992

Attest:

HARRY F. MANBECK, JR.

*Attesting Officer*     Commissioner of Patents and Trademarks

UNITED STATES PATENT AND TRADEMARK OFFICE
CERTIFICATE OF CORRECTION

PATENT NO. : 4,959,908

DATED : October 2, 1990

INVENTOR(S) : Adolf Weyrauch

It is certified that error appears in the above-identified patent and that said Letters Patent is hereby corrected as shown below:

In column 7, line 28: delete "a", second occurrence.

Signed and Sealed this

Eighteenth Day of May, 1993

Attest:

MICHAEL K. KIRK

*Attesting Officer*  *Acting Commissioner of Patents and Trademarks*